J. D. POOLE.
ANCHOR DEVICE FOR USE IN ADVANCING MUD-DITCHED VEHICLES.
APPLICATION FILED MAY 7, 1918.
1,316,323.
Patented Sept. 16, 1919.
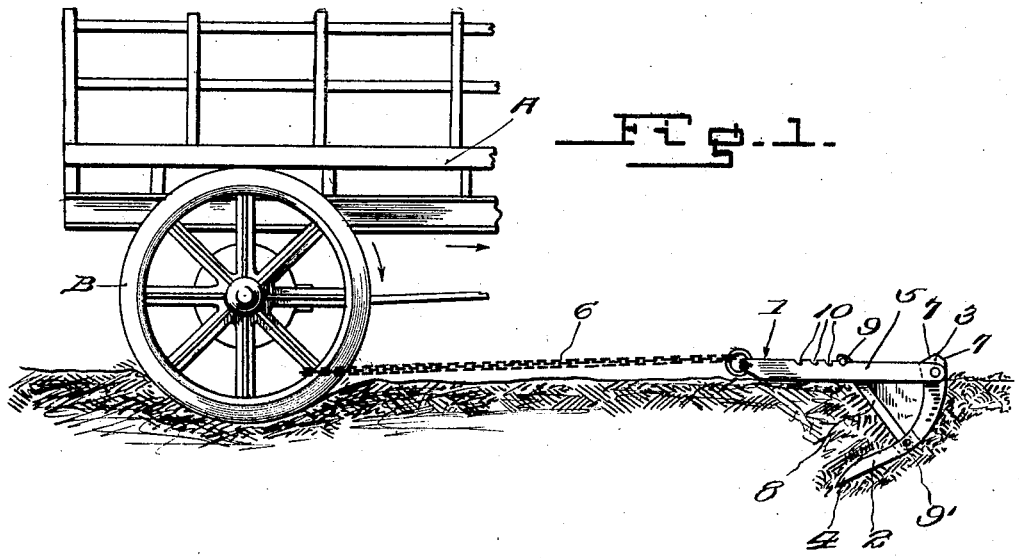
Fig. 1.
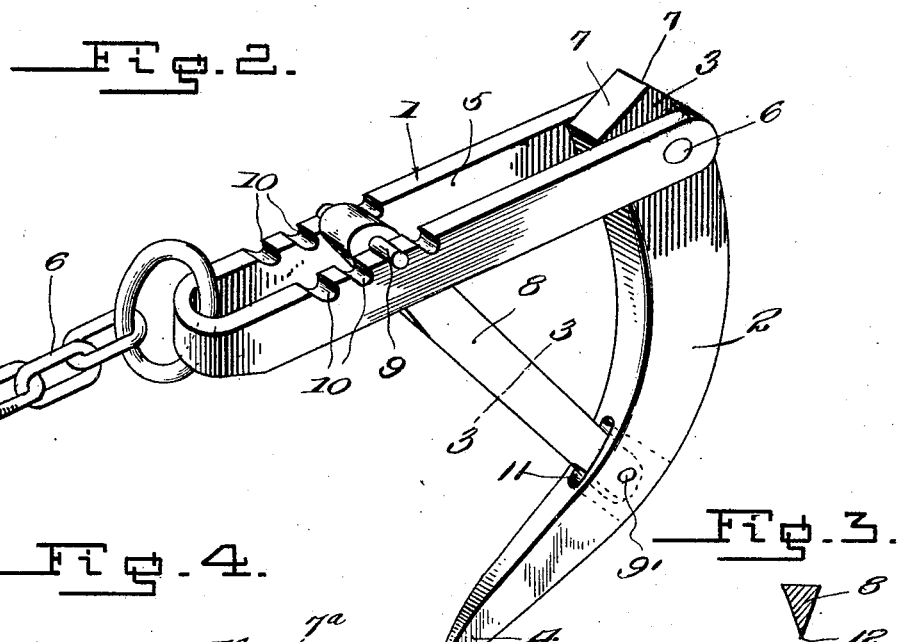
Fig. 2.
Fig. 3.
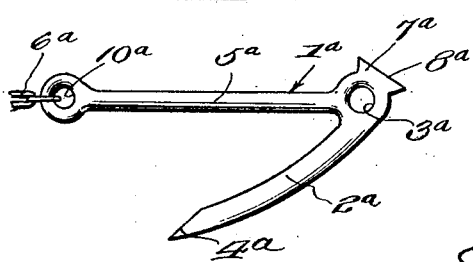
Fig. 4.
Inventor
Jonathan D. Poole.
By Lancaster Allwine
his Attorneys.

UNITED STATES PATENT OFFICE.

JONATHAN D. POOLE, OF SCIOTOVILLE, OHIO.

ANCHOR DEVICE FOR USE IN ADVANCING MUD-DITCHED VEHICLES.

1,316,323.

Specification of Letters Patent. Patented Sept. 16, 1919.

Application filed May 7, 1918. Serial No. 233,064.

*To all whom it may concern:*

Be it known that I, JONATHAN D. POOLE, a citizen of the United States, and a resident of Sciotoville, in the county of Scioto and State of Ohio, have invented certain new and useful Improvements in Anchor Devices for Use in Advancing Mud-Ditched Vehicles, of which the following is a specification.

This invention relates to an anchor device adapted for use in advancing mud-ditched motor vehicles, and the primary object of the invention is to provide an anchor device which is relatively simple in construction, and may be carried with a motor vehicle at all times, as a part of the tool equipment thereof so that in case the vehicle becomes mud-ditched, it can, by use of the improved anchor, advance itself without assistance from a second vehicle.

More specifically, the object of this invention is to provide an anchor as specified which includes an arcuate sharpened prong or arm adapted to be driven into the ground, which prong has an arm connected thereto, for prying upon the upper surface of the ground to which latter arm a chain, cable or the like is connected, and in use, the chain is attached to one of the rear drive wheels of the vehicle, so that upon rotation of this wheel by the application of a power thereto from the engine of the vehicle, the chain or cable will wind about the wheel, and owing to the secure embedding of the anchoring bar, the vehicle will be advanced.

Other objects of the invention will appear in the following detailed description, taken in connection with the accompanying drawing, forming a part of this specification, and in which drawing:

Figure 1 is a side elevation of the improved anchoring device showing the same applied to a fragment of a motor truck and embedded in the ground, ready for use.

Fig. 2 is a perspective view of the improved anchor.

Fig. 3 is a section on the line 3—3 of Fig. 2.

Fig. 4 is a side elevation of a modified form of the anchor.

Referring more particularly to the drawing, A designates a motor or analogous vehicle, of any type, having rear drive wheels B, to which the power is applied from the motor or prime mover of the vehicle to advance the same.

The improved anchoring device for use in advancing the vehicle in case the same becomes mud-ditched, is generically indicated by the numeral 1 and it comprises an arm 2, which is arcuate, curving forwardly and downwardly from its head 3 for embedding in the ground. The lower end of the arm 2, is pointed as shown at 4 to facilitate its embedding in the ground. A U-shaped arm 5 is pivotally connected as shown at 6 to the upper head end of the arm 2, and this U-shaped arm 5 has a chain, cable or similar flexible member 6 connected to the bight portion thereof which flexible member is secured to one of the drive wheels B of the vehicle A, when the latter is mud-ditched, and it is desired to advance the same. A head 3 of the anchoring arm 2 is preferably beveled as shown at 7 to form hammer or striking surfaces against which a hammer may be used for forcing the anchoring arm into the ground.

A brace 8 is pivotally connected as shown at 9 to the anchoring arm 2 and it extends upwardly between the spaced legs of the U-shaped arm 5. A transversely extending pin 9 is carried by the upper end of the arm 8 and is provided for seating in any pair of the depressions 10 formed in the legs of the U-shaped arm 5. The depressions 10 are formed in alining pairs as clearly shown in Fig. 2 of the drawing, and by providing the plurality of pairs of such depressions, adjustment of the angle between the arms 5 and 2 is permitted, without interferring with the bracing action of the brace 8. The lower end of the brace 8 is inserted in a cut-out portion or recess 11 formed in the anchoring arm 2, as clearly shown in Fig. 2 of the drawing. The brace 8 is preferably wedge-shaped in cross section, having its sharpened edge 12 positioned forwardly to facilitate its insertion in the ground, and to permit of the embedding of the anchoring arm 2 in the ground without said embedding action being retarded by the brace 8.

In use, the anchoring arm 2 is driven into the ground forwardly of the mud-ditched vehicle, and the brace 8 is properly adjusted to securely connect the arms 2 and 5, after which the chain or flexible member 6 is attached to one of the rear drive wheels B of the vehicle by wrapping the chain around one of the wheel spokes and about the tire as shown in Fig. 1 of the drawing. Thus when the wheel B is rotated, the chain will be wound about the wheel, and the said chain being anchored by the anchoring device 1 the vehicle will be advanced.

In Fig. 4 of the drawing, a modified form of the improved anchor is shown. This form is constructed of a single bar of metal bent to form a downwardly extending arcuate anchoring arm 2$^a$, the lower end of which is beveled or sharpened as shown at 4$^a$ to facilitate the insertion of the arm into the ground. An arm 5$^a$, extends at an angle to the arcuate anchoring arm 2$^a$ and is provided for resting upon the surface of the ground in which the arm 2$^a$ is embedded. The body of the anchoring device 1$^a$ is provided with an eye 3$^a$, at the junction of the arms 2$^a$ and 5$^a$ which eye is provided to facilitate the removal or withdrawal of the arcuate anchoring arm 2$^a$ from the ground. A hammer head 7$^a$ is formed upon the body of the anchor 1$^a$, and it has its flat surface 8$^a$ positioned substantially at right angles to the anchoring arm 2$^a$ whereby blows administered to this hammer head will force the anchoring arm 2$^a$ into the ground. The arm 5$^a$ has an eye 10$^a$, formed at its forward end to which a chain or analogous flexible member 6$^a$ is attached, which flexible member is adapted for attachment to a vehicle wheel in the same manner in which the chain or flexible member 6 is attached. The operation of the modified form of anchor is the same as that of the preferred form heretofore set forth.

Having fully described the invention, what is claimed is:

1. In a device for advancing mud-ditched motor vehicles, an arcuate anchoring arm, an attaching arm pivotally connected to the upper end of said anchoring arm and extending forwardly over the same, a brace pivotally connected to said anchoring arm intermediate its ends, a pin carried by the upper end of said brace and adjustably engaging said attaching arm, said brace being wedge-shaped in cross section and having its sharpened edge positioned forwardly.

2. A device for advancing mud-ditched motor vehicles comprising an arcuate anchoring arm having its lower end pointed, a substantially U-shaped attaching arm pivotally connected to the upper end of said anchoring arm and extending forwardly over the anchoring arm, said attaching arm provided with a plurality of depressions formed in its upper edge, a brace pivotally connected to said anchoring arm, a transversely extending pin carried by the upper end of said brace and adapted for seating in any alining pair of said depressions for connecting the brace to said attaching arm to maintain said attaching arm and anchoring arm in proper angled relation to each other, said brace being wedge-shaped in cross section, and a flexible member attached to the forward end of said attaching arm.

3. In a device for advancing mud-ditched motor vehicles, an arcuate anchoring arm, an attaching arm pivotally connected to the upper end of said anchoring arm and extending forwardly over the same, a brace pivotally connected to the said anchoring arm intermediate its ends, and a pin carried by the upper end of said brace and adjustably engaging said anchoring arm.

4. In a device for advancing mud-ditched motor vehicles, an arcuate anchoring arm, an attaching arm pivotally connected to the upper end of said anchoring arm and extending forwardly over the same, a brace pivotally connected to said anchoring arm intermediate its ends, said attaching arm provided with a plurality of depressions formed in its upper edge, a pin carried by the upper end of said brace and adapted for seating in any of the depressions for connecting the brace to the attaching arm to maintain said attaching arm and anchoring arm in proper angled relation to each other.

JONATHAN D. POOLE.

Copies of this patent may be obtained for five cents each, by addressing the "Commissioner of Patents, Washington, D. C."